W. G. COX.
AUTOMOBILE BUMPER BRACKET.
APPLICATION FILED JAN. 23, 1922.
1,411,955.
Patented Apr. 4, 1922.
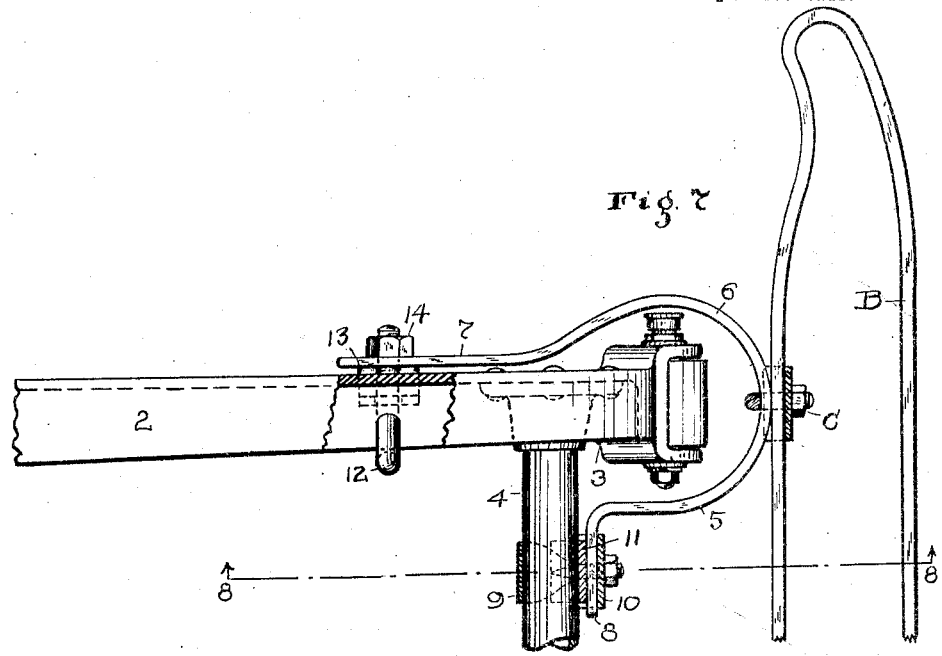
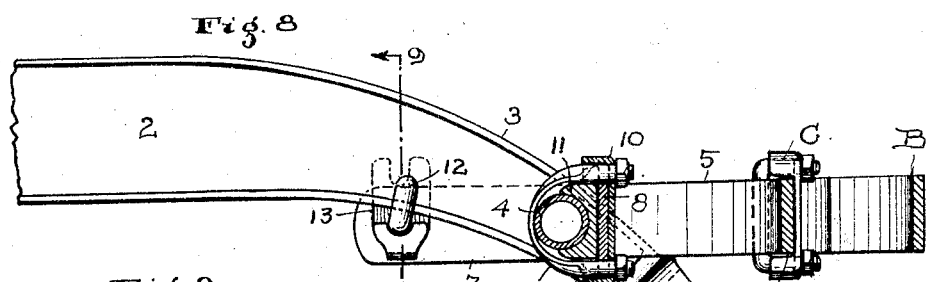
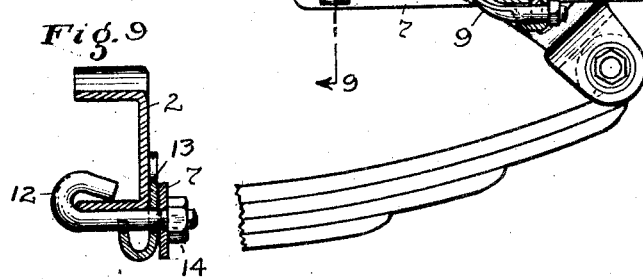
Inventor
W. G. COX

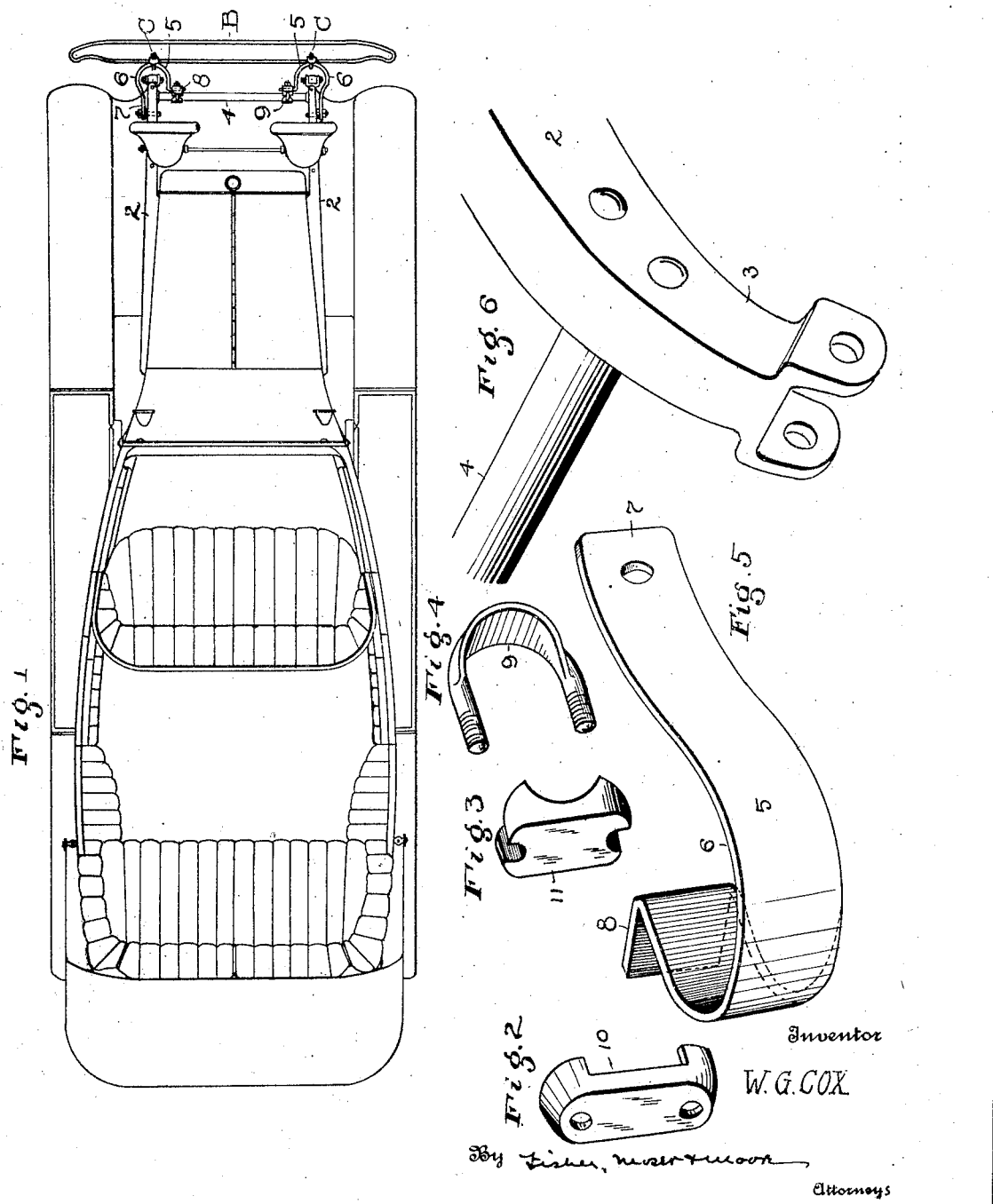

UNITED STATES PATENT OFFICE.

WILLIAM G. COX, OF CLEVELAND, OHIO.

AUTOMOBILE BUMPER BRACKET.

1,411,955. Specification of Letters Patent. Patented Apr. 4, 1922.

Application filed January 23, 1922. Serial No. 531,034.

*To all whom it may concern:*

Be it known that I, WILLIAM G. COX, a citizen of the United States, residing at Cleveland, in the county of Cuyahoga and State of Ohio, have invented certain new and useful Improvements in an Automobile Bumper Bracket, of which the following is a specification.

In many types of automobiles, especially the higher class cars, a cross-rod or tube forms a rigid part of one end of the chassis frame, and the general object of the present invention is to provide an adaptive and effective mode of mounting a buffer or bumper upon the horn ends of the frame and this cross rod or tube without altering such parts.

Thus, in the annexed drawings, Fig. 1 is a plan view, on a reduced scale, of an automobile embodying a spring buffer mounted upon the frame and cross-tube according to my invention. Figs. 2 to 5, inclusive, are enlarged perspective views of one of the spring loop brackets and the parts used to clamp it to the cross tube. Fig. 6 is a perspective view of one horn end of the chassis frame, and Fig. 7 is a plan view of the same part having a spring bracket and bumper attached thereto. Fig. 8 is a side view and section on line 8—8 of Fig. 7, and Fig. 9 is a cross section on line 9—9 of Fig. 8.

As delineated, the chassis frame comprises a channeled member 2 at each side terminating in a horn 3 to which the vehicle spring is shackled in the customary way. Extending between the two side members 2 is a round cross-rod or tube 4, which in some frames is at or relatively near the extremity of the curved horn, and in others, a short distance therefrom. This cross tubes gives rigidity and strength to the frame, and in itself affords protection to the parts behind it in the event of a collision. However, to cushion and absorb blows under such conditions, I attach a stirrup or loop-shaped bracket 5 upon the end of each side member 2 and cross tube 4 and detachably affix a spring bar bumper B by means of yokes and clips C upon the rounded front sides of said brackets.

Each stirrup or bracket 5 is made of a flat steel bar having spring properties and bent between its ends on a sweeping curve into a relatively large round loop 6, the rear end 7 of the bar extending rearwardly on straight lines and the front end 8 being bent at right angles to the rear end 7 and extending outwardly on straight lines from loop 6 to permit this portion of the stirrup to be clamped upon cross tube 4 when mounted astride horn 3 with the rear end 7 placed opposite the outer side face of channel 2, see Fig. 7. The angular end 8 of loop 6 is rigidly clamped at the front side of tube 4 by a carriage clip 9, yoke member 10, and a notched block 11 having flat and semicircular clamping faces on opposite sides thereof, whereas the straight arm or end 7 of the stirrup is rigidly secured to the channeled side 2 by means of a hook bolt 12, a supplemental clamping body 13, and a nut 14, see Fig. 9. A U-bolt may be employed in lieu of the hook bolt, or where the side wall of frame 3 is provided with a bolt opening a machine bolt may be used to fasten arm 7 rigidly in position.

When the spring bar bumper B receives a violent blow the shock is absorbed largely by the inherent spring in the bumper, and partly distributed through the spring stirrups to the cross tube and the side member of the frame. In flexing under the shock the bumper is free to rock or turn within a limited degree upon the round front face of the stirrup, and if the concussion sustained by the stirrup is extreme the loop portion thereof will also yield or bend within limits and co-act with the bumper in meeting the shock and avoiding damage to the frame and other parts of the car.

The saddle or stirrup shape of the bracket with its angular end permits it to be quickly attached in a backing or thrust position upon and against the cross tube of the frame, and the clip and block engaged with the tube supports the bracket and bumper in a stable and firm manner, although easily attached or removed because exposed in an accessible place on the car.

What I claim, is—

1. An automobile chassis frame having side and end cross members, in combination with stirrup shaped brackets having end portions adapted to be separately affixed to said side and cross members, fastening devices for said end portions, and a buffer mounted upon said brackets.

2. An automobile chassis frame having side members terminating in horns and a round cross member extending between said horns, in combination with loop-shaped brackets having angularly bent ends adapted to be affixed to said round cross members and straight ends adapted to be secured to said side members, fastening devices adapted to secure said ends detachably to said members, and a buffer mounted upon the loop-portions of said brackets.

3. An automobile chassis frame having channeled side members and a round cross piece between the corresponding ends of said members, in combination with spring stirrups having their respective end portions bent at right angles to each other to permit attachment thereof to said side members and cross piece, separate coupling and clamping devices adapted to detachably secure said end portions to said members and cross piece, and a spring bar buffer coupled to the front side of said stirrups.

4. A buffer supporting attachment for automobiles having side members and an end cross tube, comprising a stirrup having its opposite ends bent at right angles to each other to permit mounting of said ends upon the side member and the end cross tube of the automobile frame, and including a clamping device for each end of said stirrup.

5. A buffer supporting attachment for an automobile embodying a chassis frame having side members and a round end cross piece, comprising a round loop-shaped bracket of flat spring metal having straight end portions bent in the flat at right angles to each other, means adapted to clamp one of said bracket end portions upon the side member, and a clip and associated devices adapted to clamp the other end portion at the front side of said cross piece.

6. A buffer supporting bracket for an automobile having a frame provided with a round cross piece at one end thereof, said bracket comprising a round spring loop portion and straight end portions bent to extend longitudinally and laterally to permit their attachment to the outer side of the frame and the front side of said cross piece, respectively, said lateral end having a concaved portion adapted to seat said round cross piece and provided with clamping means.

In testimony whereof I affix my signature.

WILLIAM G. COX.